United States Patent [19]
Ohi et al.

[11] 3,959,824
[45] May 25, 1976

[54] TWO GAP READ/WRITE HEAD ASSEMBLY

[75] Inventors: Nobuaki Ohi; Kanzi Ito; Katsuo Kamata; Masaru Sato, all of Yokohama, Japan

[73] Assignee: Tohoku Metal Industries Limited, Japan

[22] Filed: Jan. 25, 1974

[21] Appl. No.: 436,598

Related U.S. Application Data
[62] Division of Ser. No. 203,391, Nov. 30, 1971.

[30] Foreign Application Priority Data
Nov. 30, 1970 Japan............... 45-104856
Nov. 20, 1971 Japan............... 46-92741

[52] U.S. Cl. ................. 360/124; 360/121
[51] Int. Cl.² ........................... G11B 5/20
[58] Field of Search .......... 360/124, 123, 53, 121

[56] References Cited
UNITED STATES PATENTS

| | | | |
|---|---|---|---|
| 2,689,274 | 9/1954 | Saeger | 360/124 |
| 3,165,592 | 1/1965 | Brette | 360/124 |
| 3,287,713 | 11/1966 | Porter | 360/124 |
| 3,585,314 | 6/1971 | Korn | 360/124 |
| 3,591,733 | 7/1971 | Pflughaupt | 360/124 |

Primary Examiner—Vincent P. Canney
Attorney, Agent, or Firm—Carothers and Carothers

[57] ABSTRACT

A two gap read/write head assembly including a read pole-piece and a write pole-piece which are placed in close proximity to each other in a common housing, a first auxiliary magnetic gap means being provided adjacent to and near the gap of the read pole-piece but insuring the first auxiliary magnetic gap means does not engage with the magnetic recording medium so that any feedthrough signal due to a write signal may be effectively cancelled, and/or a second auxiliary magnetic gap means being provided adjacent to and near the gap of the write pole-piece but insuring the second auxiliary magnetic gap means does not engage with the magnetic recording medium so that any leakage flux produced at the gap of the write pole-piece may be effectively cancelled by a leakage flux created at the second auxiliary magnetic gap means to reduce the feedthrough signal.

13 Claims, 17 Drawing Figures

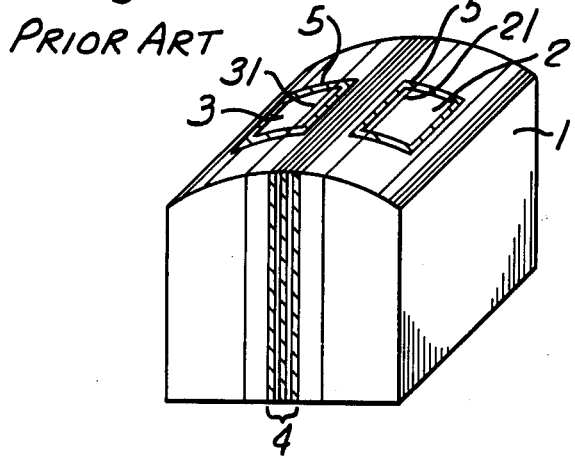
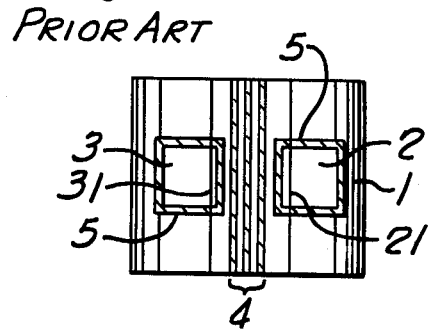
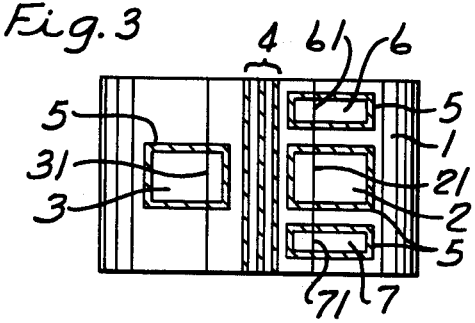
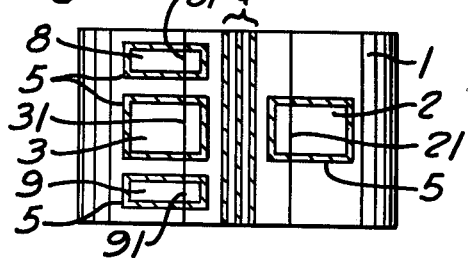
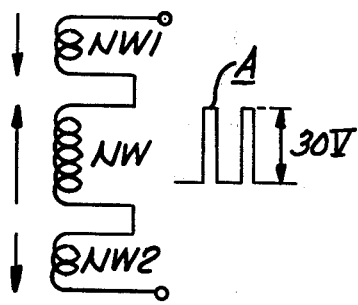
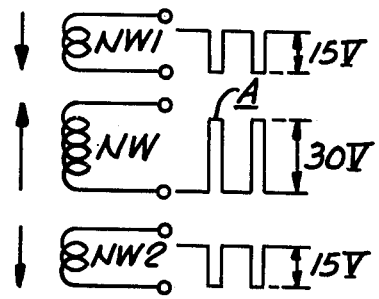
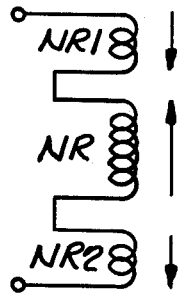

TWO GAP READ/WRITE HEAD ASSEMBLY

CROSS-REFERENCE TO RELATED APPLICATION

This is a division of application Ser. No. 203,391 filed Nov. 30, 1971 by the same inventors, which is now abandoned.

BACKGROUND OF THE INVENTION

This invention relates to improvements in read/write heads, and, in particular, to such heads having means for reducing the feedthrough signal induced in the read transducer from operation of the write transducer.

It has been well known in prior art in the magnetic recording system that recording and reproducing head means is provided to transmit to a recording medium and record information or intelligence on the medium and thereafter reproduce the recorded information. In a well-known apparatus for both recording and reproducing information, one pole piece may be provided and having a gap used for the purposes of both recording and reproducing. But there are disadvantages, such as, head life, handling operation, etc. because the immediate reproducing of a previously made record for checking purposes cannot be performed simultaneously while a new recording is being written or reproduced on the recording medium.

Recently, there has been employed a magnetic head having a two gap head arrangement in which the write pole-piece of the head preceeds the read pole-piece in the direction of motion of the magnetic recording medium. Accordingly, the intelligence recorded or written by the write pole-piece can be immediately reproduced or read out by the read pole-piece, so that the recording and reading of the intelligence for the purpose of checking for accuracy can be simultaneously performed.

In the two gap head assembly, read pole-piece and write pole-piece must be placed in very close proximity to each other in a single assembly. In order to reduce the "feedthrough" signal induced in the read pole-piece from the write pole-piece, a laminated mu-metal shield is placed in the head assembly between the write pole-piece and the read pole-piece. Furthermore, there may be provided a magnetic shield on the outside surface of the head assembly to reduce the stray magnetic field generated outside the head by the write pole-pieces and at the same time insuring the engagement between the magnetic tape and the gaps of the read and write pole-pieces.

The two gap head assembly as above described is not sufficient, however, in reducing feedthrough from the write pole-piece to the read pole-piece because gap areas of the read pole-piece and the write pole-piece must be exposed outside of magnetic shield means such as depicted in U.S. Pat. No. 3,479,662. When the motion speed of the magnetic medium relative to the head assembly is very great, the level of the read signal obtained from the read head is greater than the level of the feedthrough signal so that the feedthrough signal is not a significant disadvantage. But when the speed of the magnetic tape medium is relatively slower, the level of the read signal is nearly equal to the level of the feedthrough signal. Also the smaller the head assembly, the more ineffective is the magnetic shield to reduce the feedthrough signal, so that it is difficult to effectively reduce the feedthrough signal for different tape medium speed movements.

SUMMARY OF THE INVENTION

An object of this invention is the provision of a two gap read/write head assembly in which the feedthrough signal is effectively reduced.

Another object of this invention is the provision of a two gap read/write head assembly which is simple in construction and can be made small in size while achieving the objective of this invention.

We provide a two gap read/write head assembly which includes a write pole-piece, a read pole-piece immediately following the write pole-piece relative to the direction of a motion of the magnetic tape medium, a laminated magnetic shield means placed between the write pole-piece and the read pole-piece, and a magnetic shield casing accommodating the write and read pole-pieces and a laminated magnetic shield means, and, further, including two pseudo pole-pieces placed at both sides of at least one of either of the read or write pole-pieces. The coils of the pseudo pole-pieces are both wound in reverse direction to the coil of at least one of the read and write pole-pieces. Accordingly the feedthrough signal induced from the write pole-piece into the read pole-piece is cancelled by the signal induced due to the presence of the pseudo pole-pieces.

Further this invention provides a two gap read/write head assembly in which at least either one of the read or write pole-pieces is provided with an adjacent auxiliary gap provided on the head face opposite to the other pole-piece and adjacent the region of the face where the auxiliary gap, the latter of which is sunken below the main surface of the face so that the auxiliary gap will not engage with the magnetic tape medium. Accordingly, the feedthrough signal from the write pole-piece into the read pole-piece is suppressed.

Further objects and features of this invention will be understood from the following description of the read/write head assembly comprising this invention, relating particularly to embodiments disclosed in the annexed drawings.

BRIEF DESCRIPTIONS OF THE DRAWINGS

In the drawings:

FIG. 1 is a perspective view of a previously known two gap read/write head assembly;

FIG. 2 is a plan view of the head assembly shown in FIG. 1;

FIG. 3 is a plan view of an embodiment of the head assembly comprising this invention;

FIG. 4 is a diagrammatic view of an example of a write coil and auxiliary coils employed in the head assembly shown in FIG. 3;

FIG. 5 is a diagrammatic view of another example of the write coil and auxiliary coils that may be employed in the head assembly comprising this invention;

FIG. 6 is a plan view of another embodiment of this invention;

FIG. 7 is a diagrammatic view of the read coil

Figure 11:
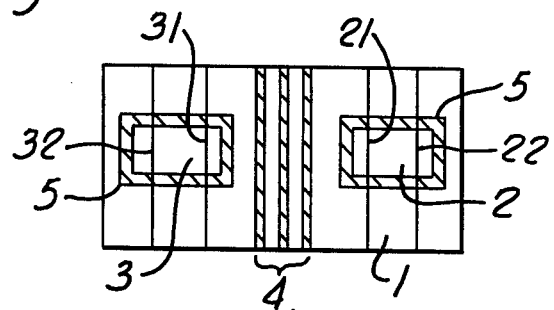
Figure 12:
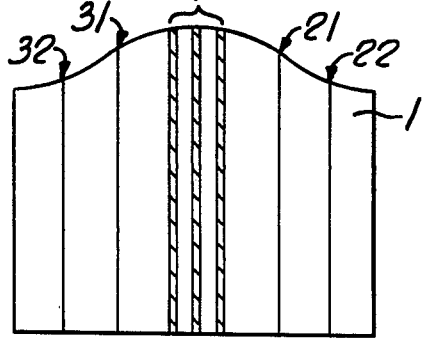
Figure 13:
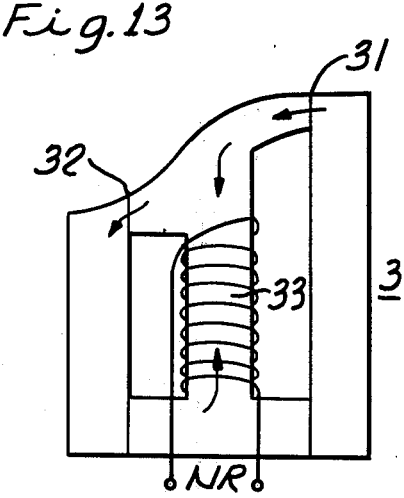
Figure 14:
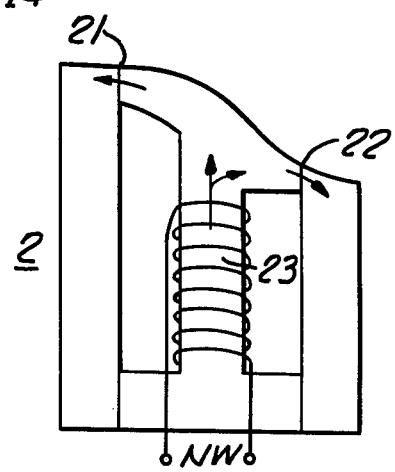

FIGS. 10(A) through 10(D) illustrate waveforms depicting the operation of the prior art head assembly shown in FIGS. 1 and 2;

FIG. 11 is a plan view of still another embodiment of the head assembly comprising this invention;

FIG. 12 is a side view of the head assembly shown in FIG. 11;

FIG. 13 diagrammatically shows a side view of a read pole-piece used in the head assembly shown in FIG. 12;

FIG. 14 diagrammatically shows a side view of a write pole-piece used in the head assembly shown in FIG. 12.

DETAILED DESCRIPTIONS OF PREFERRED EMBODIMENTS

Referring now to FIGS. 1 and 2, there is shown a two gap read/write head assembly known in the prior art and comprising the head assembly that includes a housing 1 of magnetic materials such as permalloy which serves as a magnetic shield, a write pole-piece 2 and a read pole-piece 3 which are contained in housing 1 and each respectively have gaps 21 and 31. The gaps 21 and 31 are exposed relative to the housing 1 to be engaged with the tape medium and a magnetic shield plate 4 made of a plurality of permalloy plates and Be-Cu plates mounted in the housing 1 is provided as a magnetic shield between the read and the write pole-pieces 2 and 3. A non-magnetic material 5 such as Be-Cu is utilized to prevent a magnetic coupling between pole-pieces 2 and 3 and housing 1. It is a matter of common knowledge that a write coil and a read coil are wound, respectively, to the write pole-piece 2 and the read pole-piece 3, although these coils are not shown in FIGS. 1 and 2.

Figure 10A:
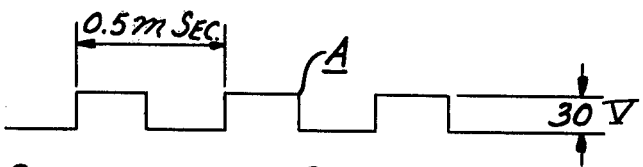
Figure 10B:
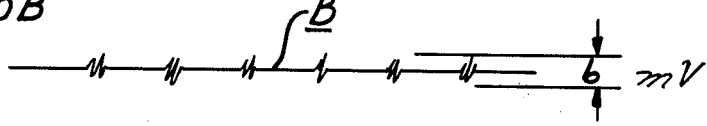
Figure 10C:
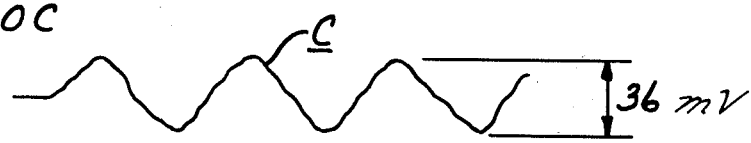
Figure 10D:

When a pulse train representing the information signal A as illustrated in FIG. 10A is applied to the write coil wound to the write pole-piece 2 to record information represented by the information signal A onto the moving magnetic tape medium (not shown), instantaneously the information signal A is read or reproduced by the read pole-piece 3, from the read coil of which is obtained the signal as shown by D in FIG. 10D. The read signal D includes the feedthrough signal shown at B in FIG. 10B and the reproduced signal C shown in FIG. 10C.

In comparison with the reproduced signal C of 36 mV, when the information signal A is 30 V, the feedthrough signal of 6 mV cannot be ignored, particularly when considering the existence of variation of the read signal level.

The important feature of this invention is the provision of means for cancelling the feedthrough signal developed in these two gap read/write head assemblies.

Referring now to FIGS. 3, 4 and 5, there is shown a two gap read/write head assembly which is similar to the prior art assembly shown in FIGS. 1 and 2 except for the provision of two auxiliary pole-pieces 6 and 7. In FIG. 3, similar parts are represented by the same reference numerals as shown in FIGS. 1 and 2. The pole-pieces 6 and 7 are respectively provided with gaps 61 and 71, which are located adjacent each side of the write pole-piece 2 and are exposed at the surface of the housing 1 and in alignment with the gap 21. However, the gaps 61 and 71 are not provided to engage the passing tape medium.

As shown in FIG. 4, the write coil NW is wound to the write pole-piece 2 and auxiliary coils $NW_1$ and $NW_2$ are wound to auxiliary pole-pieces 6 and 7 but are wound in a direction opposite to write coil NW, as indicated by the arrows, and are all connected in series as illustrated. When an information signal A as shown in FIG. 4 is applied to the in series connected coils, the information is recorded on the magnetic medium (not shown), which medium engages with the gap 21 of the pole-piece 2. The magnetic flux produced in each of the auxiliary pole-pieces 6 and 7 is in a reverse direction to the magnetic flux produced in the pole-piece 2 so that the stray flux which leaks from the magnetic path formed between the pole-piece 2 and the magnetic medium is cancelled by the auxiliary fluxes produced from auxiliary pole-pieces 6 and 7. Accordingly, there is no induced flux by means of the leakage flux in the read pole-piece 3 due to the write pole-piece 2 so that feedthrough signal is not produced. When the information signal A is 30 V, the feedthrough signal developed was found to be only 0.8 mV when employing the head assembly of this invention and effectively reducing to 13% the feedthrough signal measured in employing the head assembly of the prior art.

Referring now to FIG. 5, the write coil NW and auxiliary coils $NW_1$ and $NW_2$ are shown not to be connected in series, but a signal current is applied individually to each of these coils. It will be easily understood that the signals applied to auxiliary coils $NW_1$ and $NW_2$ should be synchronized with the signal applied to the coil NW. When the signal of 30 V was applied to the coil NW and the signal of 15 V was applied to each of auxiliary coils $NW_1$ and $NW_2$, the feedthrough signal level was found to be 0.7 mV.

Auxiliary pole-pieces may be provided at both sides of the read pole-piece 3 rather than the write pole-piece as illustrated in FIG. 6 where two auxiliary pole-pieces 8 and 9 are shown having respective gaps 81 and 91 in alignment with read gap 31. The gaps 81 and 91 are exposed at the surface of the housing 1 but do not engage the tape medium or pick up intelligence therefrom. As shown in FIG. 7, the read coil NR is wound to the read pole-piece 3 with the auxiliary coils $NR_1$ and $NR_2$ wound to the respective auxiliary pole-pieces 8 and 9 and are wound in a direction opposite to that of read coil NR as indicated by the arrows and, further, are connected in series. When a write signal is applied to the write coil (not shown) of the write pole-piece 2 in order to record information on the magnetic medium (not shown), in all three pole-pieces 3, 8 and 9 there are induced fluxes in the directions indicated by the arrows, the auxiliary flux signal being a proportional amount of the write signal. The feedthrough signals due to the induced fluxes are cancelled because the read coil NW and auxiliary coils $NW_1$ and $NW_2$ are wound in reverse directions and are also connected in series.

Figure 8:
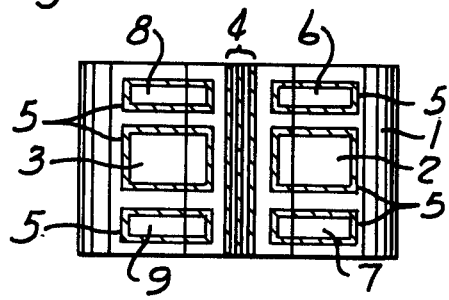
FIG. 8 is a plan view of still another embodiment of the head assembly comprising this invention.

In FIG. 8 another embodiment of this invention is illustrated employing two pairs of auxiliary coils 6, 7 and 8, 9. Since the function of cancelling the feedthrough signal in this head arrangement will be easily understood from previous descriptions relating to FIGS. 3–7, such detailed descriptions will be omitted here for the purpose of simplification. It should be noted that auxiliary coils $NR_1$ and $NR_2$ wound on the auxiliary pole-pieces 8 and 9 and the read coil NR must be connected in series as shown in FIG. 7 but auxiliary coils $NW_1$ and $NW_2$ wound to the auxiliary pole-pieces 6 and 7 and the write coil NW may be either connected in series as shown in FIG. 4, or independently connected as shown in FIG. 5. When the write signal of 30 V was applied to the write coil NW, the feedthrough signal was 0.5 mV, while the read signal was 36 mV.

In the above described three embodiments of the head assembly, auxiliary pole-pieces must not engage the magnetic tape medium. Preferably, the space between a pair of auxiliary pole-pieces 6 and 7 or 8 and 9 is wider than the width of the magnetic medium.

Figure 9:
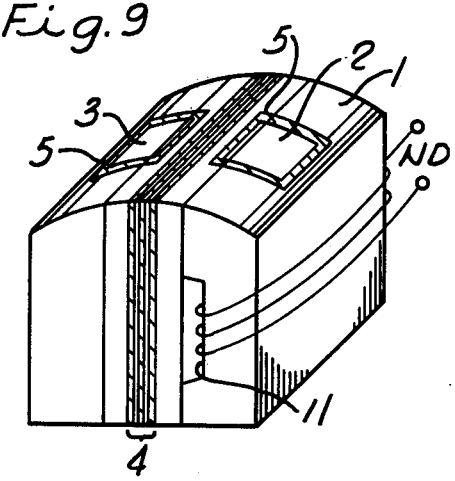
FIG. 9 is a perspective view of a further embodiment of the head assembly comprising this invention.

FIG. 9 shows another embodiment comprising this invention wherein instead of providing auxiliary pole-pieces, the portion of the housing 1 in which the write pole-piece 2 is mounted is also provided with the coil ND through a passage 11 provided in that part of the housing 1. When a current is applied to the coil ND in opposite phase relative to the write signal, a flux is produced opposite to the direction of the flux induced in the write signal. Therefore a leakage flux from the write pole-piece 2 over to the read pole-piece 3 is cancelled by this generated flux due to the current flow of the coil ND so that a feedthrough signal is not effectively produced. However, this arrangement is not as advantageous as the arrangements shown in FIGS. 3–8, as the feedthrough signal of 3 mV was measured upon the application of write signal of 30 V.

Referring now to FIGS. 11 and 12, a further embodiment is shown with a head assembly similar to that of the prior art shown in FIGS. 1 and 2, except that the write pole-piece 2 and the read pole-piece 3 have additional gaps 22 and 32, respectively. In this connection, it should be noted that the surface of the head assembly which faces the passing magnetic tape medium (not shown) is concaved at the regions where the additional gaps 22 and 32 are exposed in that surface (see FIG. 12), so that the gaps 22 and 32 will not engage with the magnetic tape medium. The surface of each pole-piece facing the magnetic tape medium is, also, partially concaved for similar purposes, as will be explained in connection with FIGS. 13 and 14.

Referring to FIGS. 13 and 14, in which the read pole-piece 3 and the write pole-piece 2 are shown with read and write coils NR and NW, respectively, each of the pole-pieces 2 and 3 have a circular magnetic path including two gasp 21 and 22 as well as 31 and 32 within the path. The magnetic path at 23 or 33 bridges between two points of the ring magnetic path around the legs of the core so that two magnetic loops through each leg and through the bridge path 23 or 33 are formed, these two magnetic loops including the two gaps 21 and 22 or 31 and 32, respectively. The rear or write coils NR and NW are wound to the bridge portions at 23 and 33 of read and write pole-pieces, resepctively.

In the read pole-piece 3, a flux is induced through gap 31 by the passing tape medium due to outer magnetic field flowing through the bridge path at 33 which is opposite to a flux induced through gap 32 flowing through the bridge path in an opposite direction. These fluxes are effectively cancelled in the bridge path 33 so that no feedthrough signal due to the employment of a single gap is picked up or produced in the read coil NR. But it should be noted that the magnetic tape medium engages only gap 31 and not gap 32, so that the recorded information on the magnetic tape medium is picked up only through gap 31 and cannot be cancelled by gap 32. Therefore, it will be easily understood that the usage of the read pole-piece as shown in FIG. 13 can be employed to cancel the effects of any feedthrough signal.

In the write pole-piece 2 as shown in FIG. 14, when a write signal is applied to the write coil NW, a flux leaking developed at gap 21 is opposite to a flux leaking developed at gap 22, which gap is not in engagement with the tape medium, and these leakage fluxes as developed are, accordingly, cancelled so that no matter the intensity of the write signal no leakage flux is induced in the read pole-piece to create a feedthrough signal.

It should be noted that the magnetic tape medium (not shown) engages only the gap 21 and not the gap 22 of the write head so that a recording can be completed without its own cancellation.

Therefore, since the head assembly shown in FIGS. 11 and 12 includes the read pole-piece in FIG. 13 and the write pole-piece in FIG. 14, the feedthrough signal is effectively cancelled.

In FIGS. 11 and 12, both the write pole-piece 2 and the read pole-piece 3 have two gaps but it will be easily understood from the foregoing that in connection with FIGS. 13 and 14, either the write pole-piece or the read pole-piece may be provided with two gaps, the other of which would only have one gap as commonly employed so that the feedthrough signal can be effectively cancelled.

This invention has been described relating to particular embodiments but it will be easily understood that they are for the purpose of exemplification without limitation and that various other modifications and other designations can be made within the scope and spirit of this invention.

We claim:

1. In a two gap read/write head assembly used for magnetic recording which comprises a housing, a write pole-piece contained in said housing, a read pole-piece contained in said housing and placed very close to said write pole-piece followingly to said write pole-piece in the direction of motion of a magnetic recording medium, respective gaps of said write pole-piece and said read pole-piece being exposed out of said housing so that said gaps may be engaged with said magnetic recording medium, a write coil wound to said write pole-piece, and a read coil wound to said read pole-piece, magnetic shield means interposed between said pole-pieces to assist in reducing feedthrough signal due to stray fluxes therebetween, an improvement comprising a pair of auxiliary pole-pieces placed at both sides of said read pole-piece so that said read pole-piece is placed between said auxiliary pole-pieces, respective gaps of said pair of auxiliary pole-pieces being aligned to the gap of said read pole-piece, and auxiliary coils wound to said respective auxiliary pole-pieces reversely to said read coil in the winding direction, said auxiliary coils and said read coil being connected in series.

2. A double magnetic head assembly employed in magnetic recording and reproducing systems comprising a head housing, a write main head comprising a write pole-piece positioned in said housing with a coil wound thereon for induction of a magnetic flux flow in said pole-piece and having a non-magnetic write gap, a read main head comprising a pole-piece positioned in said housing in aligned proximity to said write pole-piece with a coil wound thereon for induction of a magnetic flux flow in said pole-piece and having a non-magnetic read gap, said pole-piece aligned proximity causing creation of stray fluxes therebetween termed as feedthrough signal when said coils are energized, magnetic shield means interposed between said pole-pieces to assist in reducing said feedthrough signal, said gaps on the pole-piece exposed at the surface of said housing to readily and consecutively engage the surface of a magnetic tape medium traversing said head assembly surface, the improvement comprising an auxiliary head in said housing comprising an auxiliary pole-piece in juxtaposition relative to selective of either of said main heads and having a non-magnetic gap exposed on the surface of said housing positioned out of alignment with the alignment of said main head gaps in a manner not to be in immediate proximity with a recording medium traversing said main head gaps, an auxiliary coil wound on said auxiliary pole-piece in a direction opposite to the coil of said selected main head and means to produce a magnetic flux flow in said auxiliary pole-piece opposite to that created in said selected main head to effectively cancel said feedthrough signal.

3. The head assembly of claim 2 characterized by a pair of auxiliary heads each having an auxiliary pole-piece and a magnetic gap and respectively positioned on opposite sides of selective of either of said main heads with their gaps in a straight line alignment with said selected main head, and an auxiliary coil wound on each of said auxiliary pole-pieces in a direction opposite to that of said selected main head coil to produce a magnetic flux flow opposite to that created in said selected main head.

4. The head assembly of claim 3 characterized in that said pair of auxiliary heads are respectively positioned on opposite sides of said write head, and each of said auxiliary coils are connected in series with said write pole-piece coil.

5. The head assembly of claim 3 characterized in that said pair of auxiliary heads are respectively positioned on opposite sides of said read head, and each of said auxiliary coils are connected in series with said read pole-piece.

6. The head assembly of claim 3 characterized by two pairs of auxiliary heads, the first pair respectively positioned on opposite sides of said write head and the second pair positioned on opposite sides of said read head.

7. The head assembly of claim 6 characterized in that each of the auxiliary coils of said auxiliary head pair positioned relative to said write head are connected in series with said write pole-piece coil.

8. The head assembly of claim 7 characterized in that each of the auxiliary coils of said auxiliary head pair positioned relative to said read head are connected in series with said read pole-piece coil.

9. The head assembly of claim 2 characterized by a passage provided transversely through said housing in that position containing said write main head in lieu of said auxiliary head, and an auxiliary coil wound around said housing through said passage and means to produce a magnetic flux flow in said housing portion opposite to that created in said write main head to effectively cancel said feedthrough signal.

10. The head assembly of claim 2 characterized in that said auxiliary head and selected main head have an integral pole-piece supported in said housing comprising a center and two end legs with a pair of non-magnetic gaps provided on the forward end of said three leg pole-piece, one readily engaging the surface of said magnetic tape medium traversing said head assembly surface and the other positioned not to be in immediate proximity with said recording medium, said selected main head coil wound around said center means to induce a magnetic flux flow in opposite directions respectively across said gaps to effectively cancel said feedthrough signal.

11. The head assembly of claim 10 characterized by an integral three leg pole-piece for said read main head and for said write main head, each of said three leg pole-pieces having a pair of magnetic gaps with said read head coil and said write head coil respectively wound on said center leg.

12. A double magnetic head assembly for simultaneously writing and reading signals on a moving magnetic tape comprising a housing including a reading head and a writing head each having a pole-piece and a working gap for engagement with the surface of the magnetic tape, a magnetic shield interposed between said writing and reading heads, a reading coil in said reading head and a writing coil in said writing head, the proximity of said heads causing the creation of a feedthrough signal due to stray fluxes therebetween when energized, said assembly characterized by at least one auxiliary head including an auxiliary pole-piece in said housing in juxtaposed position relative to selective of either of said reading or writing head and having a non-magnetic gap in aligned side position with the working gap of said selected head, the juxtaposed position of said auxiliary gap such as not to engage said magnetic tape, an auxiliary coil wound on said auxiliary pole-piece in a direction opposite to that of the coil in said selected head and means to produce a magnetic flux in said auxiliary head to effectively cancel said feedthrough signal.

13. A double magnetic head assembly for simultaneously writing and reading signals on a moving magnetic tape comprising a housing including a reading head and a writing head each having a pole-piece and coil and a working gap for engagement with the surface of the magnetic tape, a magnetic shield interposed between said writing and reading heads, a reading coil in said reading head and a writing coil in said writing head, the proximity of said heads causing the creation of a feedthrough signal due to stray fluxes therebetween when energized, said assembly characterized by a pair of auxiliary heads in said housing each including an auxiliary pole-piece and each adjacent one side of selective of either said reading or writing head and each having a non-magnetic gap both in aligned position with the working gap of said selected head, the position of said auxiliary gaps such as not to engage said magnetic tape, auxiliary coils wound on said auxiliary pole-pieces in a direction opposite to that of the coil in said selected head, said auxiliary coils connected in series with said selected head, the magnetic flux produced in said auxiliary heads effective to cancel said feedthrough signal.

* * * * *